(12) United States Patent
Nimbavikar et al.

(10) Patent No.: US 11,991,525 B2
(45) Date of Patent: May 21, 2024

(54) WIRELESS DEVICE ACCESS AND SUBSIDY CONTROL

(71) Applicant: T-Mobile USA, Inc., Bellevue, WA (US)

(72) Inventors: Gunjan Nimbavikar, Sammamish, WA (US); Peter Mwangi, Overland Park, KS (US); Ryan Christopher Lindstrom, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 349 days.

(21) Appl. No.: 17/541,073

(22) Filed: Dec. 2, 2021

(65) Prior Publication Data

US 2023/0180008 A1 Jun. 8, 2023

(51) Int. Cl.
*H04W 12/48* (2021.01)
*H04W 12/08* (2021.01)
(Continued)

(52) U.S. Cl.
CPC .......... *H04W 12/48* (2021.01); *H04W 12/08* (2013.01); *H04W 12/126* (2021.01); *H04W 12/72* (2021.01); *H04W 84/042* (2013.01)

(58) Field of Classification Search
CPC ... H04W 12/48; H04W 12/126; H04W 12/72; H04W 12/08; H04W 84/042
See application file for complete search history.

(56) References Cited

U.S. PATENT DOCUMENTS 6,131,024 A 10/2000 Boltz
6,445,914 B1 9/2002 Findikli et al.
(Continued)

FOREIGN PATENT DOCUMENTS

CN 1829145 A 9/2006
CN 101496059 A 7/2009
(Continued)

OTHER PUBLICATIONS

"Google Nexus 6 Releases on T-Mobile with No. Frills." Nov. 25, 2014. <www.latinpost.com/home/news/services/print.php?article_id=26473>. 1 page.
(Continued)

*Primary Examiner* — Wayne H Cai
(74) *Attorney, Agent, or Firm* — Perkins Coie LLP (57) ABSTRACT

The disclosed technology provides systems and methods for dynamically locking and unlocking wireless communication devices by enforcing updateable subscriber identity module (SIM) and public land mobile network (PLMN) policy information. A device receives policy information from a policy server, compares the policy information against information in the SIM and dynamically updates a lock state of the device based on the policy information, potentially overriding a factory lock state of the device. The policy information can include a whitelist indicating the SIMs that the device can accept. The device can also obtain and apply branding information when the SIM information matches the received policy information, and block access to certain device functionality when the SIM information does not match the policy information.

20 Claims, 4 Drawing Sheets

(51) Int. Cl.
  *H04W 12/126*  (2021.01)
  *H04W 12/72*  (2021.01)
  *H04W 84/04*  (2009.01)

(56) References Cited

U.S. PATENT DOCUMENTS

| | | |
|---|---|---|
| 7,096,014 B2 | 8/2006 | Haverinen et al. |
| 7,165,191 B1 | 1/2007 | Vakrat |
| 7,260,382 B1 | 8/2007 | Lamb et al. |
| 7,266,371 B1 | 9/2007 | Amin et al. |
| 7,447,502 B2 | 11/2008 | Buckley et al. |
| 7,493,111 B2 | 2/2009 | Knowles |
| 7,715,824 B2 | 5/2010 | Zhou |
| 7,817,988 B2 | 10/2010 | Kruis et al. |
| 7,904,895 B1 | 3/2011 | Cassapakis et al. |
| 7,958,258 B2 | 6/2011 | Yeung et al. |
| 7,991,988 B2 | 8/2011 | Chen |
| 8,027,666 B2 | 9/2011 | Xie et al. |
| 8,036,656 B2 | 10/2011 | Jeong et al. |
| 8,107,926 B2 | 1/2012 | Goto |
| 8,116,766 B2 | 2/2012 | Muller |
| 8,185,097 B2 | 5/2012 | Vanderlinden et al. |
| 8,185,101 B1 | 5/2012 | Wiseman et al. |
| 8,208,898 B2 | 6/2012 | Huang et al. |
| 8,249,654 B1 | 8/2012 | Zhu |
| 8,260,281 B2 | 9/2012 | Urbanek |
| 8,285,254 B2 | 10/2012 | Chen |
| 8,380,205 B2 | 2/2013 | Hogan |
| 8,401,538 B2 | 3/2013 | Urbanek |
| 8,401,595 B2 | 3/2013 | Zhu et al. |
| 8,412,186 B2 | 4/2013 | Aidee et al. |
| 8,413,209 B2 | 4/2013 | Aldera et al. |
| 8,433,953 B1 | 4/2013 | Gaudette et al. |
| 8,442,521 B2 | 5/2013 | Fleischman et al. |
| 8,463,277 B2 | 6/2013 | Huang et al. |
| 8,489,096 B2 | 7/2013 | Rasanen |
| 8,571,536 B2 | 10/2013 | Urbanek |
| 8,612,967 B1 | 12/2013 | Delker |
| 8,613,073 B2 | 12/2013 | Mccann et al. |
| 8,626,165 B1 | 1/2014 | Narasimhan et al. |
| 8,666,383 B1 | 3/2014 | Mauer et al. |
| 8,707,288 B2 | 4/2014 | Roseborough |
| 8,780,797 B2 | 7/2014 | Chen et al. |
| 8,781,457 B2 | 7/2014 | Randazzo et al. |
| 8,819,188 B2 | 8/2014 | Blatherwick et al. |
| 8,825,039 B2 | 9/2014 | Mizuguchi |
| 8,825,753 B2 | 9/2014 | Kaleem et al. |
| 8,832,777 B2 | 9/2014 | Raleigh et al. |
| 8,848,592 B2 | 9/2014 | Jung et al. |
| 8,909,291 B1 | 12/2014 | Spanel et al. |
| 8,948,755 B2 | 2/2015 | Nenner et al. |
| 8,995,989 B2 | 3/2015 | Jheng et al. |
| 9,026,105 B2 | 5/2015 | Shipley et al. |
| 9,026,107 B2 | 5/2015 | Manalo |
| 9,042,877 B1 | 5/2015 | Ghoshal et al. |
| 9,084,147 B2 | 7/2015 | Ahmavaara |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-el-ella et al. |
| 9,197,714 B2 | 11/2015 | Stenfelt et al. |
| 9,204,286 B1 | 12/2015 | Annan et al. |
| 9,313,643 B1 | 4/2016 | Ghoshal et al. |
| 9,445,274 B2 | 9/2016 | Haberkorn |
| 9,451,455 B2 | 9/2016 | Cormier et al. |
| 9,516,491 B2 | 12/2016 | Lihosit et al. |
| 9,532,211 B1 * | 12/2016 | Sumner .................. G06F 21/35 |
| 9,544,758 B2 | 1/2017 | Sen et al. |
| 9,584,995 B2 | 2/2017 | Chuttani et al. |
| 9,712,983 B2 | 7/2017 | Dandra et al. |
| 9,788,190 B2 | 10/2017 | Park et al. |
| 9,794,418 B2 | 10/2017 | Pieda et al. |
| 9,817,992 B1 | 11/2017 | Paczkowski et al. |
| 9,883,384 B2 | 1/2018 | Lee et al. |
| 9,913,132 B1 | 3/2018 | Ghoshal et al. |
| 9,935,694 B2 | 4/2018 | Shan |
| 9,967,851 B2 | 5/2018 | Cormier et al. |
| 9,992,760 B2 | 6/2018 | Jiang et al. |
| 10,009,750 B2 | 6/2018 | Agiwal et al. |
| 10,021,240 B1 | 7/2018 | Ghoshal et al. |
| 10,149,145 B2 | 12/2018 | Li et al. |
| 10,187,785 B2 | 1/2019 | Huang et al. |
| 10,212,538 B2 | 2/2019 | Russell |
| 10,219,153 B2 | 2/2019 | Rajadurai |
| 10,219,211 B2 | 2/2019 | Sharma et al. |
| 10,284,245 B2 | 5/2019 | Thakkar et al. |
| 10,574,670 B1 | 2/2020 | Verma et al. |
| 10,623,946 B1 | 4/2020 | Kumar et al. |
| 10,645,230 B1 | 5/2020 | Tandon et al. |
| 10,856,248 B2 | 12/2020 | Chun et al. |
| 10,856,340 B2 | 12/2020 | Huang-fu et al. |
| 11,032,704 B2 | 6/2021 | Joseph et al. |
| 11,089,534 B2 | 8/2021 | Jun et al. |
| 2002/0091931 A1 | 7/2002 | Quick et al. |
| 2002/0142753 A1 | 10/2002 | Pecen et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | Oconnor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0085222 A1 | 4/2005 | Przybilski et al. |
| 2005/0119001 A1 | 6/2005 | Watanabe |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0135144 A1 | 6/2006 | Jothipragasam |
| 2006/0154651 A1 | 7/2006 | Knowles |
| 2006/0160529 A1 | 7/2006 | Glass |
| 2006/0160537 A1 | 7/2006 | Buckley et al. |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Mohammed et al. |
| 2007/0004404 A1 | 1/2007 | Buckley et al. |
| 2007/0015538 A1 | 1/2007 | Wang |
| 2007/0077915 A1 | 4/2007 | Black et al. |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2007/0254646 A1 | 11/2007 | Sokondar |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0167027 A1 | 7/2008 | Gautier et al. |
| 2008/0171532 A1 | 7/2008 | Shieh et al. |
| 2008/0220743 A1 | 9/2008 | Mora et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou et al. |
| 2009/0061840 A1 | 3/2009 | Fleischman et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0119773 A1 | 5/2009 | D'Amore et al. |

(56) References Cited

U.S. PATENT DOCUMENTS

| | | |
|---|---|---|
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0181662 A1 | 7/2009 | Fleischman et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0099403 A1 | 4/2010 | Kim |
| 2010/0112981 A1 | 5/2010 | Suh et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0203864 A1 | 8/2010 | Howard |
| 2010/0207742 A1 | 8/2010 | Deo et al. |
| 2010/0222031 A1 | 9/2010 | Carolan et al. |
| 2010/0222047 A1 | 9/2010 | Vanderlinden et al. |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-mcconnell et al. |
| 2011/0072488 A1 | 3/2011 | Bi et al. |
| 2011/0081885 A1 | 4/2011 | Sennett et al. |
| 2011/0119716 A1 | 5/2011 | Coleman |
| 2011/0138074 A1 | 6/2011 | Onda et al. |
| 2011/0143703 A1 | 6/2011 | Seo et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0222404 A1 | 9/2011 | Watson et al. |
| 2011/0225280 A1 | 9/2011 | Delsesto et al. |
| 2011/0230136 A1 | 9/2011 | Washiro |
| 2011/0246178 A1 | 10/2011 | Arzelier |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0093031 A1 | 4/2012 | Wang et al. |
| 2012/0094684 A1 | 4/2012 | Reddy |
| 2012/0100892 A1 | 4/2012 | Arzelier et al. |
| 2012/0106431 A1 | 5/2012 | Wu et al. |
| 2012/0106509 A1 | 5/2012 | Klingenbrunn et al. |
| 2012/0129513 A1 | 5/2012 | van der |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0220269 A1* | 8/2012 | Feng ................ H04L 63/0853 455/411 |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0276924 A1 | 11/2012 | Li et al. |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065578 A1 | 3/2013 | Raleigh et al. |
| 2013/0072168 A1 | 3/2013 | Colucciello et al. |
| 2013/0085914 A1 | 4/2013 | Mcpherson et al. |
| 2013/0111461 A1 | 5/2013 | Zubas et al. |
| 2013/0137417 A1 | 5/2013 | Urbanek et al. |
| 2013/0196647 A1 | 8/2013 | Raleigh et al. |
| 2013/0198567 A1 | 8/2013 | Ahmed et al. |
| 2013/0222395 A1 | 8/2013 | Blas |
| 2013/0223369 A1 | 8/2013 | Nenner et al. |
| 2013/0237225 A1 | 9/2013 | Martin |
| 2013/0281085 A1 | 10/2013 | Sen et al. |
| 2013/0288693 A1 | 10/2013 | Dai et al. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0329639 A1 | 12/2013 | Wietfeldt et al. |
| 2014/0045483 A1 | 2/2014 | Whidden |
| 2014/0075567 A1 | 3/2014 | Raleigh et al. |
| 2014/0080467 A1 | 3/2014 | Urbanek et al. |
| 2014/0098671 A1 | 4/2014 | Raleigh et al. |
| 2014/0099916 A1 | 4/2014 | Mallikarjunan et al. |
| 2014/0113610 A1 | 4/2014 | Ramprasad et al. |
| 2014/0200048 A1 | 7/2014 | Cheng |
| 2014/0206313 A1 | 7/2014 | Spanel et al. |
| 2014/0213233 A1 | 7/2014 | Parry et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0017962 A1 | 1/2015 | Howard et al. |
| 2015/0056985 A1 | 2/2015 | Swaminathan et al. |
| 2015/0065105 A1 | 3/2015 | Masterson et al. |
| 2015/0111564 A1 | 4/2015 | Urbanek et al. |
| 2015/0111565 A1 | 4/2015 | Urbanek et al. |
| 2017/0374604 A1 | 12/2017 | Stenfelt et al. |
| 2020/0322884 A1 | 10/2020 | Di Girolamo et al. |
| 2020/0351755 A1 | 11/2020 | Huang-fu et al. |
| 2021/0021993 A1 | 1/2021 | Yang et al. |
| 2021/0185540 A1 | 6/2021 | Gundavelli et al. |
| 2021/0227438 A1 | 7/2021 | Xu |
| 2021/0281995 A1 | 9/2021 | Kumar et al. |

FOREIGN PATENT DOCUMENTS

| | | |
|---|---|---|
| CN | 100574214 C | 12/2009 |
| CN | 101047506 B | 10/2010 |
| CN | 101374050 B | 4/2011 |
| CN | 101414907 B | 10/2011 |
| CN | 102238688 A | 11/2011 |
| CN | 102271367 A | 12/2011 |
| CN | 102421168 A | 4/2012 |
| CN | 101437067 B | 5/2012 |
| CN | 102547609 A | 7/2012 |
| CN | 103002432 A | 3/2013 |
| CN | 103037469 A | 4/2013 |
| CN | 101730202 B | 5/2013 |
| CN | 103313227 A | 9/2013 |
| CN | 105813152 B | 3/2019 |
| CN | 111294888 A | 6/2020 |
| CN | 109309766 B | 7/2020 |
| CN | 112369056 A | 2/2021 |
| CN | 112954768 A | 6/2021 |
| CN | 113079514 A | 7/2021 |
| EP | 1001640 A1 | 5/2000 |
| EP | 1095530 A1 | 5/2001 |
| EP | 1681888 A1 | 7/2006 |

(56) References Cited

FOREIGN PATENT DOCUMENTS

| | | |
|---|---|---|
| EP | 1681804 B1 | 4/2008 |
| EP | 1438869 B1 | 3/2009 |
| EP | 2086252 A1 | 8/2009 |
| EP | 1850617 B1 | 12/2009 |
| EP | 1360860 B1 | 6/2010 |
| EP | 2247039 A1 | 11/2010 |
| EP | 1495652 B1 | 3/2011 |
| EP | 2375808 A1 | 10/2011 |
| EP | 1819184 B1 | 11/2012 |
| EP | 3448089 A1 | 2/2019 |
| EP | 3512291 A1 | 7/2019 |
| EP | 3837867 A1 | 6/2021 |
| EP | 3735770 B1 | 7/2021 |
| EP | 3857934 A1 | 8/2021 |
| JP | 2005080266 A | 3/2005 |
| JP | 2007299259 A | 11/2007 |
| JP | 2010516211 A | 5/2010 |
| JP | 2011517862 | 6/2011 |
| JP | 2012231260 A | 11/2012 |
| JP | 5265594 B2 | 5/2013 |
| KR | 20030047476 A | 6/2003 |
| KR | 100599001 B1 | 7/2006 |
| KR | 100622876 B1 | 9/2006 |
| KR | 100628309 B1 | 9/2006 |
| KR | 100641896 B1 | 11/2006 |
| KR | 100787575 B1 | 12/2007 |
| KR | 20070122288 A | 12/2007 |
| KR | 20080011749 A | 2/2008 |
| KR | 100858146 B1 | 9/2008 |
| KR | 20090056277 A | 6/2009 |
| KR | 20090078277 A | 7/2009 |
| KR | 20090085319 A | 8/2009 |
| KR | 100936605 B1 | 1/2010 |
| KR | 100997163 B1 | 11/2010 |
| KR | 20110070390 A | 6/2011 |
| KR | 101059794 B1 | 8/2011 |
| KR | 101327261 B1 | 11/2013 |
| KR | 20140024796 A | 3/2014 |
| KR | 20140064601 A | 5/2014 |
| KR | 20140135039 A | 11/2014 |
| KR | 101518165 B1 | 5/2015 |
| KR | 20190097826 A | 8/2019 |
| KR | 20190097832 A | 8/2019 |
| KR | 20190097835 A | 8/2019 |
| KR | 20200075981 A | 6/2020 |
| KR | 20200075982 A | 6/2020 |
| KR | 20200075983 A | 6/2020 |
| KR | 20200075984 A | 6/2020 |
| KR | 20200075985 A | 6/2020 |
| KR | 102254702 B1 | 5/2021 |
| WO | 2006010336 A1 | 2/2006 |
| WO | 2007076729 A1 | 7/2007 |
| WO | 2008019626 A1 | 2/2008 |
| WO | 2008128459 A1 | 10/2008 |
| WO | 2010118566 A1 | 10/2010 |
| WO | 2011026354 A1 | 3/2011 |
| WO | 2011079712 A1 | 7/2011 |
| WO | 2011094952 A1 | 8/2011 |
| WO | 2011110012 A1 | 9/2011 |
| WO | 2011134320 A1 | 11/2011 |
| WO | 2011137695 A1 | 11/2011 |
| WO | 2011137817 A1 | 11/2011 |
| WO | 2011140780 A1 | 11/2011 |
| WO | 2011144033 A1 | 11/2011 |
| WO | 2012034468 A1 | 3/2012 |
| WO | 2012058969 A1 | 5/2012 |
| WO | 2012078753 A1 | 6/2012 |
| WO | 2012122828 A1 | 9/2012 |
| WO | 2012145988 A1 | 11/2012 |
| WO | 2012151945 A1 | 11/2012 |
| WO | 2012167494 A1 | 12/2012 |
| WO | 2013023506 A1 | 2/2013 |
| WO | 2013109619 A1 | 7/2013 |
| WO | 2013152715 A1 | 10/2013 |
| WO | 2013169983 A1 | 11/2013 |
| WO | 2014030893 A1 | 2/2014 |
| WO | 2014046814 A1 | 3/2014 |
| WO | 2014113128 A1 | 7/2014 |
| WO | 2014123758 A1 | 8/2014 |
| WO | 2014123759 A1 | 8/2014 |
| WO | 2014158430 A1 | 10/2014 |
| WO | 2015030945 A1 | 3/2015 |
| WO | 2015060965 A2 | 4/2015 |
| WO | 2015085940 A1 | 6/2015 |
| WO | 2015169334 A1 | 11/2015 |
| WO | 2016004559 A1 | 1/2016 |
| WO | 2016005795 A1 | 1/2016 |
| WO | 2016037365 A1 | 3/2016 |
| WO | 2016041208 A1 | 3/2016 |
| WO | 2016082222 A1 | 6/2016 |
| WO | 2017030713 A1 | 2/2017 |
| WO | 2017036107 A1 | 3/2017 |
| WO | 2017041562 A1 | 3/2017 |
| WO | 2017066910 A1 | 4/2017 |
| WO | 2017078794 A1 | 5/2017 |
| WO | 2017113385 A1 | 7/2017 |
| WO | 2018000867 A1 | 1/2018 |
| WO | 2018010480 A1 | 1/2018 |
| WO | 2020185949 A2 | 9/2020 |
| WO | 2020225308 A1 | 11/2020 |
| WO | 2020250548 A1 | 12/2020 |
| WO | 2021002268 A1 | 1/2021 |
| WO | 2021020190 A1 | 2/2021 |
| WO | 2021020913 A1 | 2/2021 |

OTHER PUBLICATIONS

"MobileIron. < www.mobileiron.com/en> accessed Jul. 2, 2015, 1 page.".

"Symantec Corporation. "Business Challenge: Mobile Device Management." <www.symantec.com/mobile-device-management/> accessed Jul. 2, 2015, 1 page.".

"T-Mobile clarifies that its Nexus 6 is free from bloatware and carrier branding." Nov. 24, 2014. <thedroidguy.com2014/11/t-mobile-clarifies-that-its-nexus-6-is-free-from-bloatware-and-carrier-branding-99946#2GCtKdsBDbyq04Lo.97> 1 page.

"TmoNews The Unofficial T-Mobile Blog, "Unlike its competitors, T-Mobile keeps the Nexus 6 unbranded." Nov. 24, 2014. <www.tmonews.com/2014/11/unlike-its-competitors-t-mobile-keeps-the-nexus-6-unbranded/>. 1 page.".

"Wikipedia. "Mobile device management." <en.wikipedia.org/wiki/Mobile_device_management> accessed Jul. 2, 2015, 6 pages.".

"Wikipedia. "Over-the-air programming." <en.wikipedia.org/wiki/Over-the-air_programming> accessed Jul. 2, 2015, 3 pages.".

\* cited by examiner

WIRELESS DEVICE ACCESS AND SUBSIDY CONTROL

BACKGROUND

A subscriber identity module (SIM) lock, network lock, carrier lock, or (master) subsidy lock is a technical restriction built into wireless communication devices (e.g., a mobile device such as a smartphone) by original equipment manufacturers (OEMs) for use by service providers or network operators to restrict the use of the devices to specific countries and/or networks and/or network brands. "Unlocked" devices do not impose any SIM restrictions. There can be multiple levels of locks placed on devices to block the use of other networks' SIMs. These are usually referred to as Network Control Key (NCK) and Service Provider Control Key (SPCK). Additionally, the device can also have a regional lock based on a Region Control Key (RGCK) (e.g., device restricted to European networks).

One benefit of SIM-locking devices is to allow network operators to discount the devices to their customers in exchange for a contract to pay for the use of the network for a specified time thereby recouping the subsidy over the life of the contract. Sim-locking prevents users from signing a contract with one network operator or one brand to obtain a discounted device, and then stopping to pay the monthly bill (thus breaching the contract) and using the device on another network or selling the device at a profit. Consequently, SIM locking or device network locking is commonly used when subsidized devices are sold with prepaid contracts.

Devices can be locked to accept only SIMs with certain International Mobile Subscriber Identities (IMSIs). IMSIs can be restricted by one or more of: Mobile country code (MCC), e.g., device will only work with SIM issued in one country); mobile network code (MNC), e.g., device will only work on a specific network or network brand (e.g., AT&T, T-Mobile, Metro, Assurance, Verizon, etc.); mobile subscriber identification number (MSIN), e.g., only one SIM can be used with the device; group identity (GID), e.g., device restricted to a single mobile virtual network operator (MVNO) of a certain network operator, etc.

Besides SIM locking, wireless communication devices can also have firmware installed on them that is specific to the network operator or the network operator's brand. For example, a T-Mobile branded phone in the United States can include software or firmware to display T-Mobile's logo and enable certain features provided by T-Mobile.

BRIEF DESCRIPTION OF THE DRAWINGS

Detailed descriptions of implementations of the present invention will be described and explained using the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A device access and subsidy control (DASC) technology is disclosed. The systems and methods associated with DASC gate a wireless communication device's out of box experience (OOBE) processes or flows on the device's successful SIM policy update. The disclosed technology allows a network operator to obtain or source a single device from an OEM to serve all of the network operator's brands, e.g., an unbranded universal stock keeping unit (SKU) device from a manufacturer that is multi-brand factory locked (where the OEM locks the device at the factory to use only SIMs from a certain brand). When such a device is sold and activated in any of the operator's sales channels (brands), the network operator can deliver new SIM policies as part of the OOBE.

In one aspect of the disclosed technology, as part of the initial device activation or provisioning, the unbranded or OEM-branded device receives brand-specific SIM or public land mobile network (PLMN) policies and applies the policies and branding to the device once a match between the SIM and the dynamically reconfigurable policy is confirmed. The UE dynamically updates a lock state based on the policy information, possibly overriding a factory lock state. For example, the lock state can be based on a whitelist indicating the SIMs that the UE can accept (e.g., list or range of IMSIs that the UE can work with).

In another aspect of the disclosed technology, the UE can retrieve from a datastore and apply to the UE branding information if the SIM information matches the policy information or otherwise restrict certain functionality of the UE if the SIM information does not match the policy information. After initial activation or provisioning, the device can receive new policies defining new lock states, new lock policy whitelist updates, new branding, new network configurations or updates to service access lists, etc.

The disclosed technology allows a network operator to apply device subsidies and/or control access to their subsidized devices even when the devices are not connected to the operator's network. This can be used, for example, to protect subsidies associated with the sales channel that the device is sold into. The ability to source multi-brand factory-locked SKUs additionally provides for inventory flexibility by eliminating the need to obtain multiple SKUs of the same device, with each SKU being factory locked to a different brand.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
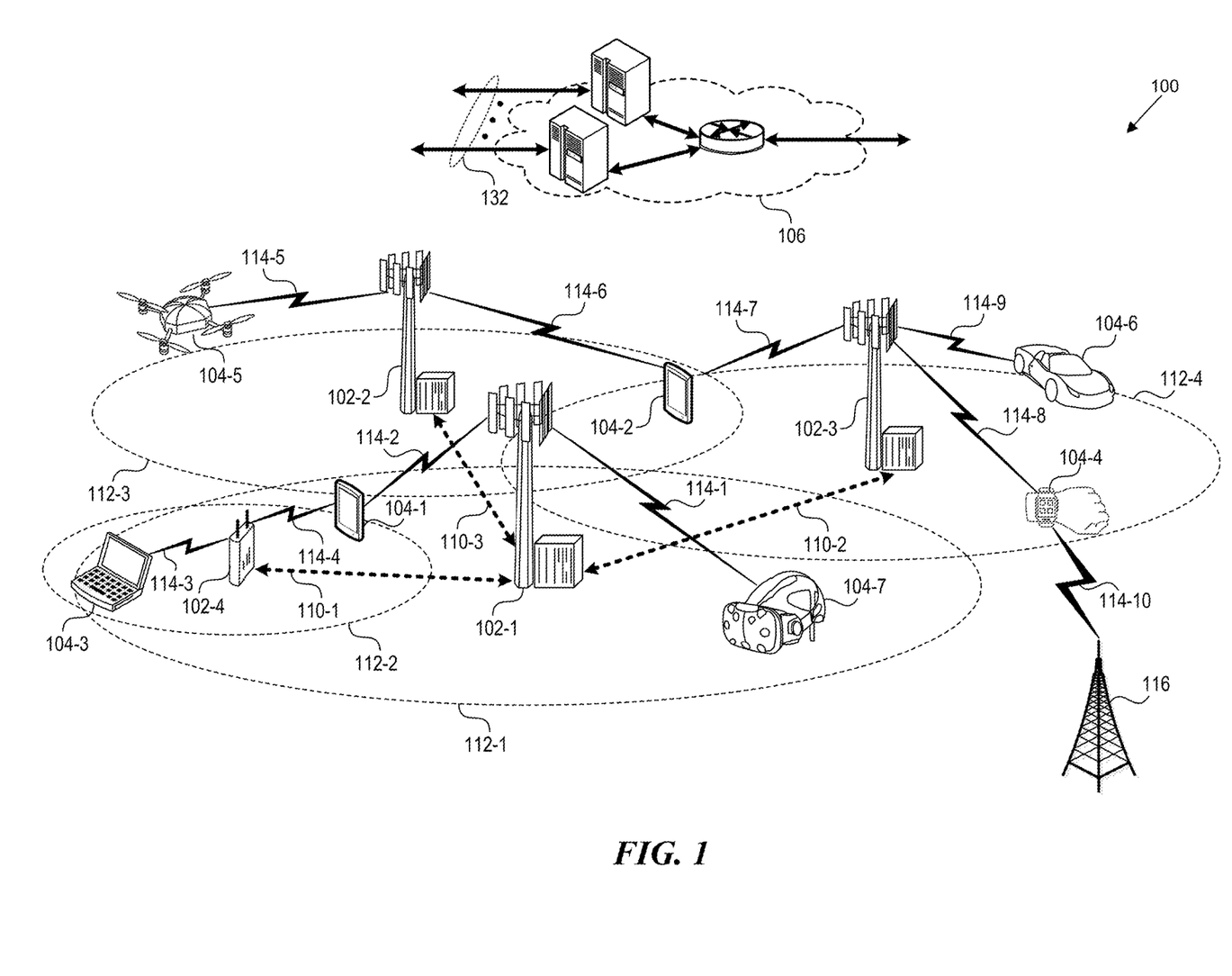
FIG. 1 is a block diagram that illustrates a wireless communications system.

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

Computer System

Figure 2:
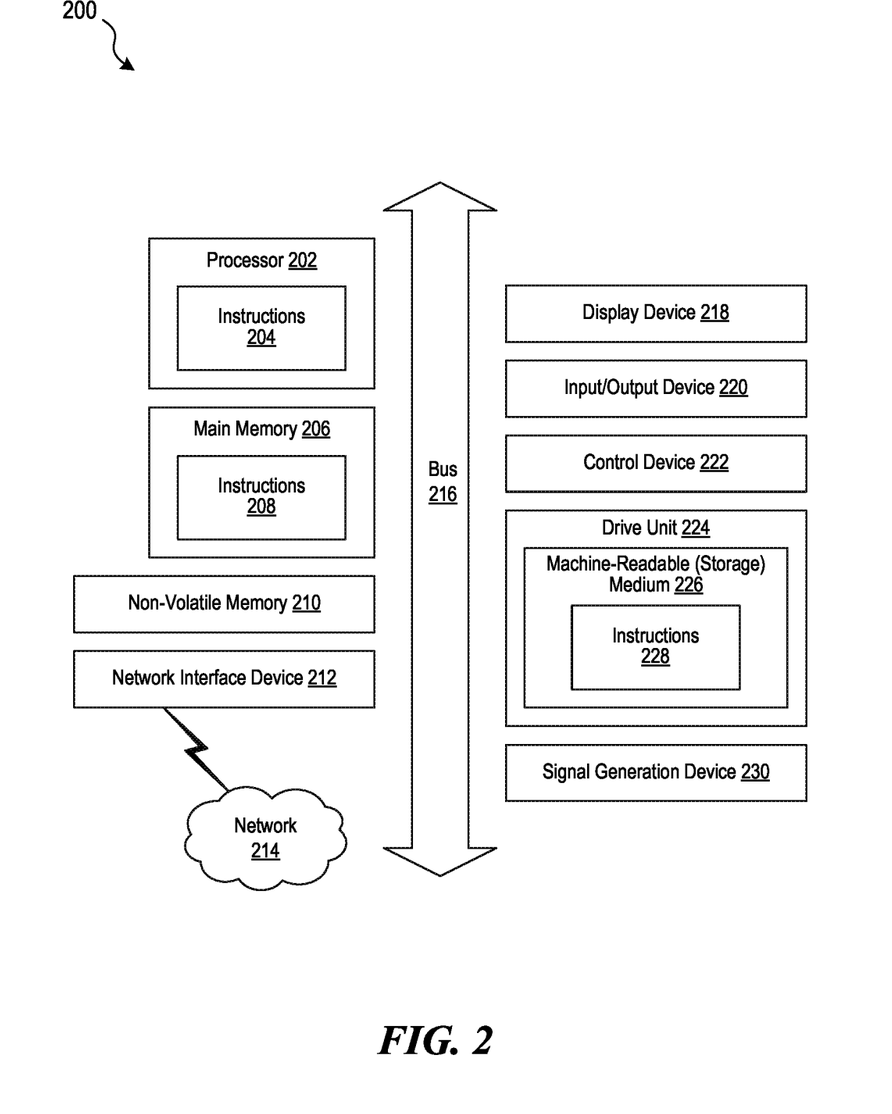
FIG. 2 is a block diagram that illustrates an example of a computer system in which at least some operations described herein can be implemented.

FIG. 2 is a block diagram that illustrates an example of a computer system 200 in which at least some operations described herein can be implemented. As shown, the computer system 200 can include: one or more processors 202, main memory 206, non-volatile memory 210, a network interface device 212, video display device 218, an input/output device 220, a control device 222 (e.g., keyboard and pointing device), a drive unit 224 that includes a storage medium 226, and a signal generation device 230 that are communicatively connected to a bus 216. The bus 216 represents one or more physical buses and/or point-to-point connections that are connected by appropriate bridges, adapters, or controllers. Various common components (e.g., cache memory) are omitted from FIG. 2 for brevity. Instead, the computer system 200 is intended to illustrate a hardware device on which components illustrated or described relative to the examples of the figures and any other components described in this specification can be implemented.

The computer system 200 can take any suitable physical form. For example, the computing system 200 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 200. In some implementation, the computer system 200 can be an embedded computer system, a system-on-chip (SOC), a single-board computer system (SBC) or a distributed system such as a mesh of computer systems or include one or more cloud components in one or more networks. Where appropriate, one or more computer systems 200 can perform operations in real-time, near real-time, or in batch mode.

The network interface device 212 enables the computing system 200 to mediate data in a network 214 with an entity that is external to the computing system 200 through any communication protocol supported by the computing system 200 and the external entity. Examples of the network interface device 212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 206, non-volatile memory 210, machine-readable medium 226) can be local, remote, or distributed. Although shown as a single medium, the machine-readable medium 226 can include multiple media (e.g., a centralized/distributed database and/or associated caches and servers) that store one or more sets of instructions 228. The machine-readable (storage) medium 226 can include any medium that can store, encoding, or carrying a set of instructions for execution by the computing system 200. The machine-readable medium 226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 204, 208, 228) set at various times in various memory and storage devices in computing device(s). When read and executed by the processor 202, the instruction(s) cause the computing system 200 to perform operations to execute elements involving the various aspects of the disclosure.

Figure 3:
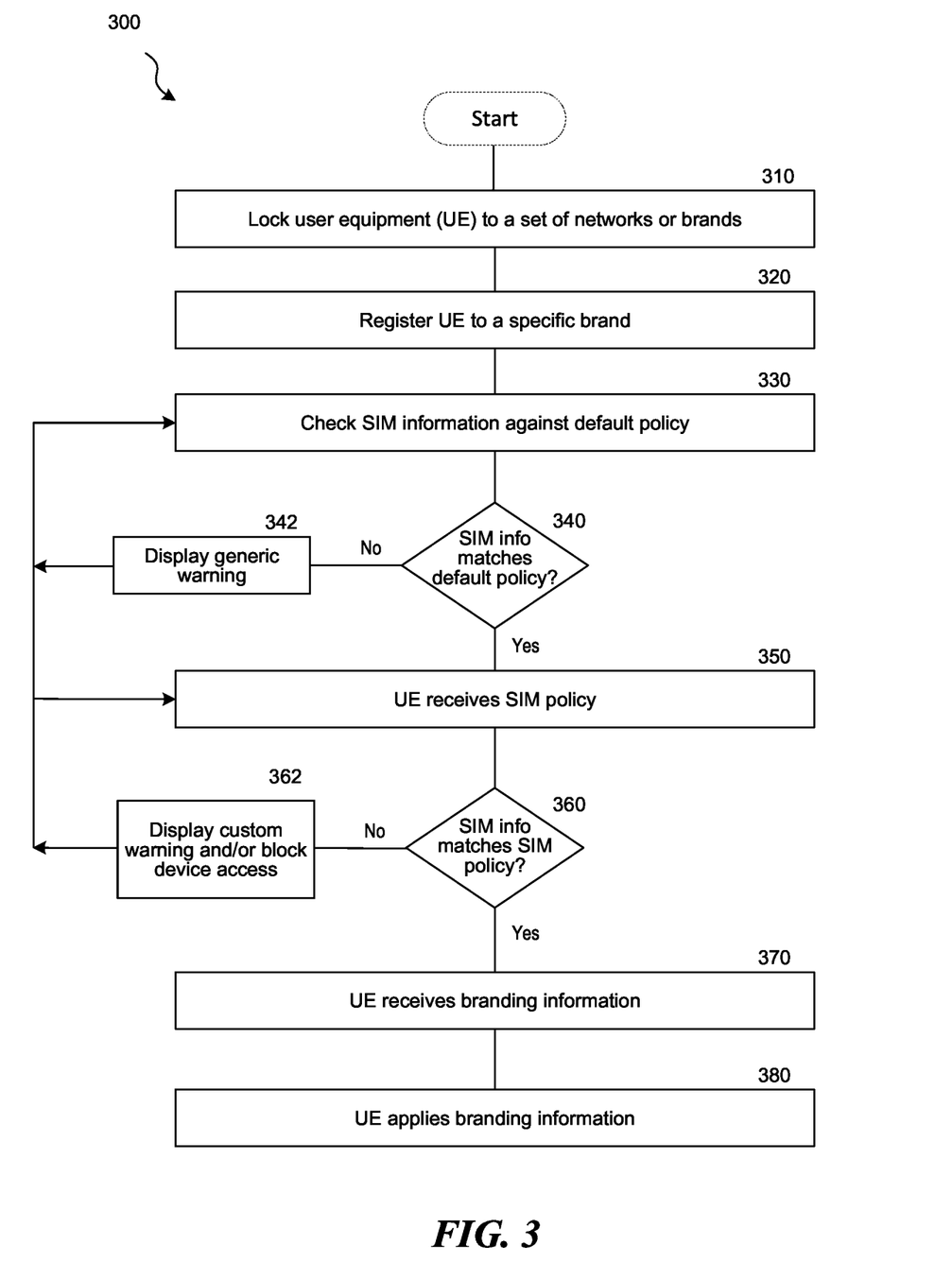
FIG. 3 is a flowchart that illustrates a process for updating and enforcing SIM policies on a wireless communication device.

FIG. 3 is a flowchart 300 that illustrates a process for updating and enforcing SIM policies on a wireless communication device or user equipment (UE) (e.g., wireless devices 104 in FIG. 1 which include mobile devices such as cellphones and data devices). At block 310, the UE is factory locked (e.g., by the OEM) to a set of networks or brands. The set of networks or brands can include distinct networks (e.g., networks operated by tier-1 wireless carriers such as T-Mobile, AT&T and Verizon), partly or fully virtual networks (e.g., networks operated by tier-2 or tier-3 carriers), or brands of the networks (as described below). For example, a UE can be factory-locked such that it only accepts certain subscriber identity modules (SIMs) associated with specific networks or brands.

Multi-Brand Factory Lock

A "brand" can be, for example: a pre-paid brand offering pre-paid network services; a post-paid brand offering post-paid services; a brand associated with a subsidiary mobile virtual network operator (MVNO), e.g., an MVNO offering services to specific classes of subscribers (e.g., low-income users, enterprise users, etc.), or specific types of devices (e.g., IoT devices, home internet devices, etc.); a brand associated with another affiliated network (e.g., network of a merged entity), etc. Each brand typically has distinct or differentiated set of services offered to the brand's subscribers (available on the devices).

A network operator supporting multiple brands typically orders multiple SKUs of the same UE where each SKU is locked to a different brand. For example, T-Mobile could receive 4 different SKUs of the same Samsung Galaxy S10 variant: a first SKU factory-locked to the T-Mobile brand; a second SKU factory-locked to the Sprint brand; a third SKU factory-locked to the MetroPCS (or Metro) brand; and a fourth SKU factory-locked to the Assurance brand. Without factory-unlocking the UE, each UE SKU can only accept a SIM for the brand for which it is targeted (e.g., one might be unable to use an Assurance SIM on a T-Mobile-brand SKU device or vice-versa).

The disclosed technology allows UEs to be brand-agnostic when received from the OEM or factory but still locked to the operator's brands (e.g., to protect the operator's subsidies on the UE). For example, as received from the OEM, the device can be generically branded or OEM-branded. Instead of ordering multiple SKUs, each SKU factory-locked to each brand as described above, the OEM can ship to the operator UEs with a global or universal SKU that is factory-locked to all of the operator's brands (e.g., Samsung can ship to T-Mobile one universal SKU of a Samsung Galaxy S10 variant that can be activated on any of T-Mobile's brands). As described in detail below, this allows the network operator to activate the brand-agnostic UE with any of its brand-specific SIM cards (e.g., the Samsung Galaxy S10 variant with the universal SKU can be activated in T-Mobile's Assurance or Metro sales channel and thus can work with an Assurance or Metro SIM but cannot be activated in a Verizon or AT&T sales channel or work with those SIMs).

In some implementations, the UEs can also be operator-agnostic in addition to or in lieu of being brand-agnostic. The OEM can factory-lock the UE to support two or more operator networks (and/or one of more brands for each operator). For example, a universal SKU of a Samsung Galaxy S10 variant can be factory-locked to work on the T-Mobile network (including all of T-Mobile's brands) and also work on the Verizon network (including all of Verizon's brands). Once the universal SKU device's IMEI is registered in a T-Mobile sales channel, the device becomes locked to T-Mobile and can only work with T-Mobile SIMs thereafter and not Verizon or other operator SIMs. This allows the operators to maintain a network or brand-specific subsidy while still being able to order universal hardware from the OEMs.

In some implementations, the UEs can also be factory-unlocked (not locked to any network or brand). The network operator then network-locks or brand-locks the UE as described below based on SIM policy updates.

The ability to source a universal SKU that is factory-locked to any of the operator's brands (or completely unlocked) provides the operator with inventory flexibility because they need not know ahead of time how many of each brand-specific SKU they need to source. The operator can source a large volume of the universal SKU and can brand lock the universal SKU to specific brands at the point-of-sale or after activation to protect brand-specific subsidies or features.

Although this description uses SIM broadly to refer to the SIM application and/or the SIM hardware, it will be appreciated that the SIM can be any of a universal integrated circuit card (UICC) containing a SIM application and/or a universal SIM (USIM) application, or the SIM can be an embedded SIM (eSIM) that can be remotely provisioned. The SIM or eSIM can contain a unique serial number, an IMSI number, security authentication and ciphering information, temporary information related to the local network (e.g., a location area identity), a list of services that the user or UE has access to, and passwords (e.g., a personal identification number (PIN) for ordinary use, and a personal unblocking key (PUK) for PIN unlocking).

SIM Policy Update and Enforcement

At block 320, the network operator registers the UE to a specific brand. When the UE is sold at a brand-specific or operator-specific sales channel, the UE hardware (e.g., based on the UE's International Mobile Equipment Identity (IMEI)) is registered to the brand or operator associated with that sales channel. For example, if a universal SKU Samsung Galaxy S10 that is factory-locked to any of T-Mobile's brand is sold in a Metro sales channel, the IMEI of the UE sold is registered to Metro; if another of the universal SKU UE is sold in an Assurance sales channel, the IMEI of that UE is registered to Assurance. Similarly, if the UE was operator-agnostic or unlocked, the IMEI of that UE would be registered with the operator in whose sales channel the device was sold, preventing the UE from being used with another operator's SIM.

At block 330, the UE checks the information in the SIM against a default policy where the default policy is based on the multi-brand or multi-operator factory lock (e.g., the default policy is based on the list of brands or networks that the UE can operate on or the SIMs that the UE can work with). For example, a UE in a T-Mobile sales channel checks if the SIM corresponds to any of T-Mobile's brands. When the operator activates a SIM (or registers an eSIM), the SIM/eSIM can contain an international mobile subscriber identity (IMSI) number that is associated with the network operator (e.g., a first network operator can be assigned a first range of IMSIs, and a second network operator can be assigned a second mutually exclusive range of IMSIs). At block 330, the UE can check if the SIM parameters to validate the SIM, including MCC, MNC, and GID, falls within the expected operator/MVNO range. In some implementations, the UE can check if the SIM's IMSI is within an expected range of IMSIs loaded into the SIM. Here the "IMSI range" can be a subset of IMSIs within which an operator can assign to a brand or MVNO, and which can change over time. The check against the IMSI range loaded on the device can be a second qualification mechanism in addition to or in lieu of the previously described MCC-MCN-GID mechanism.

In some implementations, in addition to applying a multi-brand factory-lock, the OEM can also include a default policy based on the multiple brands that the UE is locked to. The "multi-brand factory-lock" can provide an indication that the default OEM policy includes multiple brands and are not separate entities.

If at block 340, the SIM inserted into the UE or the registered eSIM profile does not match the default policy (e.g., UE locked to one IMSI range and SIM IMSI is not within that range), the UE, at block 342, can display a generic warning message indicating that a restricted SIM is being used and/or a message requesting the SIM unlock code (e.g., message indicating "SIM network unlock PIN," "Enter Network Lock Control Key," "This SIM card can only be used on specific networks. Contact your customer service center for the unlock code," or other similar generic message indicating that the SIM doesn't match the UE's lock code.) The UE can be stuck at this step and not proceed with the OOBE flow unless a different SIM or a new eSIM profile is used with the UE. For example, if a new SIM is inserted the UE can check the new SIM information against the default policy at block 330.

Conversely, if at block 340 the SIM inserted into the UE or the registered eSIM profile matches the default policy (e.g., SIM's IMSI is within the range of IMSIs that the UE is factory-locked to), the UE at block 350 receives a SIM policy from a SIM policy server in the operator's wireless communication network. For example, the UE can check into the SIM policy server to pull a custom SIM policy before proceeding to the out-of-box-experience (OOBE) flow as described below.

In some implementations, the SIM policy received at block 350 corresponds to the IMEI registered at block 320. For example, if the IMEI corresponding to the UE is registered to a Metro prepaid brand at block 320, the SIM policy received at block 350 can correspond to policies for prepaid UEs (e.g., UE's use restrictions related to the UE being associated with a prepaid brand).

At block 360, the UE checks if the SIM information matches the SIM policy received at block 350 (e.g., similar to the check against the default policy at block 330). For example, the UE can check if the list of services indicated in the SIM matches the services indicated in the SIM policy; if the SIM's IMSI matches the range of IMSIs indicated in the SIM policy (which could be different from the range of IMSIs that the UE is factory-locked to); if the MCC, MNC, and GID, falls within the expected operator/MVNO range, etc. At block 360, like in block 330, the UE validates the SIM parameters against a "fixed" table. The fixed policy table can be dynamically updated prior to a policy request and policy push/pull to the UE at block 350.

If the SIM information does not match the SIM policy, the UE, at block 362, can block access to one or more UE features. For example, the UE can block access to specific applications (e.g., the UE can completely take over the UE screen or limit the UE's functionality such as only allow Wi-Fi access or block Wi-Fi access or block Wi-Fi calling, only allow emergency calling, only allow walled-garden access to operator's predetermined websites, restrict access to certain network slices (e.g., high speed, high reliability, low latency slices, or high bandwidth slice, or slices suited for a particular application such as slices for enhanced coverage IoT applications), etc.); block access to certain data speeds; block access to specific radio access technologies (RATs), etc. The operator's firmware can enforce the SIM policy, for example, by using Android OS, Apple IOS, or other operating system application programming interfaces (APIs) to disable access to certain functionality (e.g., block Wi-Fi access or only allow for Wi-Fi access to operator's walled garden).

Additionally, or alternatively, the UE at block 362 can display a custom warning message on the UE's display screen informing the user of the SIM policy mismatch. Unlike the generic warning message of block 342, the UE at block 362 can provide more specific information regarding the mismatch at block 360, such as a custom message indicating a SIM information that would match the policy information. For example, the message could provide information regarding the SIM information that was expected or the type of SIM that was expected or the SIM policy that was violated (e.g., "this device only accepts a T-Mobile SIM," "this device was registered to Metro and has 2 months of contract remaining," "please return this device to XYZ Corp.," "this device will only work with a SIM with MNC-MCC+GID equal to . . . ," etc.).

In some implementations, the UE can receive the custom message from another server based on the error code (e.g., policy mismatch code). In other implementations, the SIM policy server provides the possible custom messages to display as part of the SIM policy updates.

In some implementations, the UE sends the SIM information to a server (e.g., the SIM policy server) where the SIM information is checked against the SIM policy and the result of the check (either pass or fail) is communicated to the UE. Because this requires the UE to be on-network during the check, but the check should be occurring before the SIM can be used for network access, non-cellular connectivity (e.g., Wi-Fi connectivity) can be used during the check for devices with modem architectures that supports such "out-of-band" or "out-of-cellular-coverage" SIM checks.

The restrictions at block 362 can prevent the UE from being used in another operator's network; in a brand other than the brand that the IMEI was registered to at block 320; by a user who is no longer paying installments on the device; by an ex-employee with a UE registered to the ex-employee's employer (e.g., the UE can alert the ex-employee to return the device to the employer—the ability to block access to all or a portion of features of the UE prevents the user from ignoring the alert messages unlike say emailing or otherwise messaging the user to return the device); or generally from otherwise being used in a manner contrary to the terms or contract that the user agreed to.

For example, the device OEM can set the default device lock to only T-Mobile and Metro which would exclude Assurance, for example, thereby preventing the device from being used with the Assurance brand from the factory. On policy update at block 350, the device could be further restricted to a single brand, e.g., only Metro, or the device could be allowed to use a new brand, e.g., T-Mobile for Business (TFB). Additionally, if the operator wanted to open up the device to its entire ecosystem of MVNOs, the OEM could include a 1-N list of all MVNO MCC-MNC-GID combinations and then, based on a operator/MVNO agreement, the operator could push a unique policy at block 350. If the SIM MCC-MNC-GID was not preloaded as part of the default policy checked at block 330, the corresponding SIM/eSIM profile would be rejected until block 350. SIMs rejected by default at block 340 can be added by the SIM policy update at block 350.

If at block 360, the SIM information does not match the SIM policy received at block 350, the UE is unable to proceed with the OOBE flow until the UE either receives a new SIM policy at block 350 which matches the SIM information, or unless the user inserts a new SIM (or registers a new eSIM profile) where the new SIM information is checked against and matches the default policy (blocks 330 and 340), and matches the SIM policy at block 360.

If at block 360 the SIM information matches the SIM policy received at block 350, the UE at block 370 receives branding information (e.g., from a branding server) and applies the branding information at block 380. The user can then use the UE without SIM policy based restrictions.

In some implementations, custom device branding is only allowed where there is a sales registration with a successful SIM match to an updated SIM policy. Branding information can include, for example, the look and feel associated with the device including the wallpaper and startup logo displayed by the UE, ringtones available in the UE, bookmarks, selection of applications available on the UE, etc. Branding information can also include special firmware customized to the particular brand or network, for example, allowing access to certain services or features or specific network configurations (e.g., a selection of services that the UE has access to).

The disclosed technology allows for a dynamic rebranding of the UE based on SIM policy updates and dynamically restricting or enabling the UE's services. For example, access to Wi-Fi calling can be based on the brand (restrictions could include the complete disablement and suppression of the Wi-Fi Calling Menu); Network Slicing can be enabled for specific brands of customers and the type of network slice available to the customer can depend on the brand. For example, IoT devices activated on operator's IoT brands (e.g., operator's NB-IoT or LTE-M networks), can be enabled to request or utilize IoT-specific network slices, etc. If UE is temporarily authorized to operate in a different network or different brand, the UE can be dynamically rebranded for that different brand or network.

In some implementations, the branding server containing the branding information and the SIM policy server containing the custom SIM policy are the same server or storage location.

In some implementations, the UE can update the SIM information (e.g., information stored in the UICC or eSIM) based on the SIM policy received at block 350. For example, if at block 310 the UE was originally factory-locked to accept only T-Mobile SIMs (e.g., access Metro or Assurance SIMs), and at block 320 the UE is sold and registered in a Metro sales channel, the check at block 330 would match if an Assurance SIM was inserted into the UE (e.g., the Assurance IMSI matches the factory-lock to any T-Mobile brand). If at block 350 the UE received a SIM policy restricting the UE's list of services when a non-Metro-branded SIM is inserted, the UE can update the list of services in the Assurance SIM to only those services supported while the Assurance SIM is in the Metro-targeted UE.

Dynamic Lock/Unlock

Figure 4:
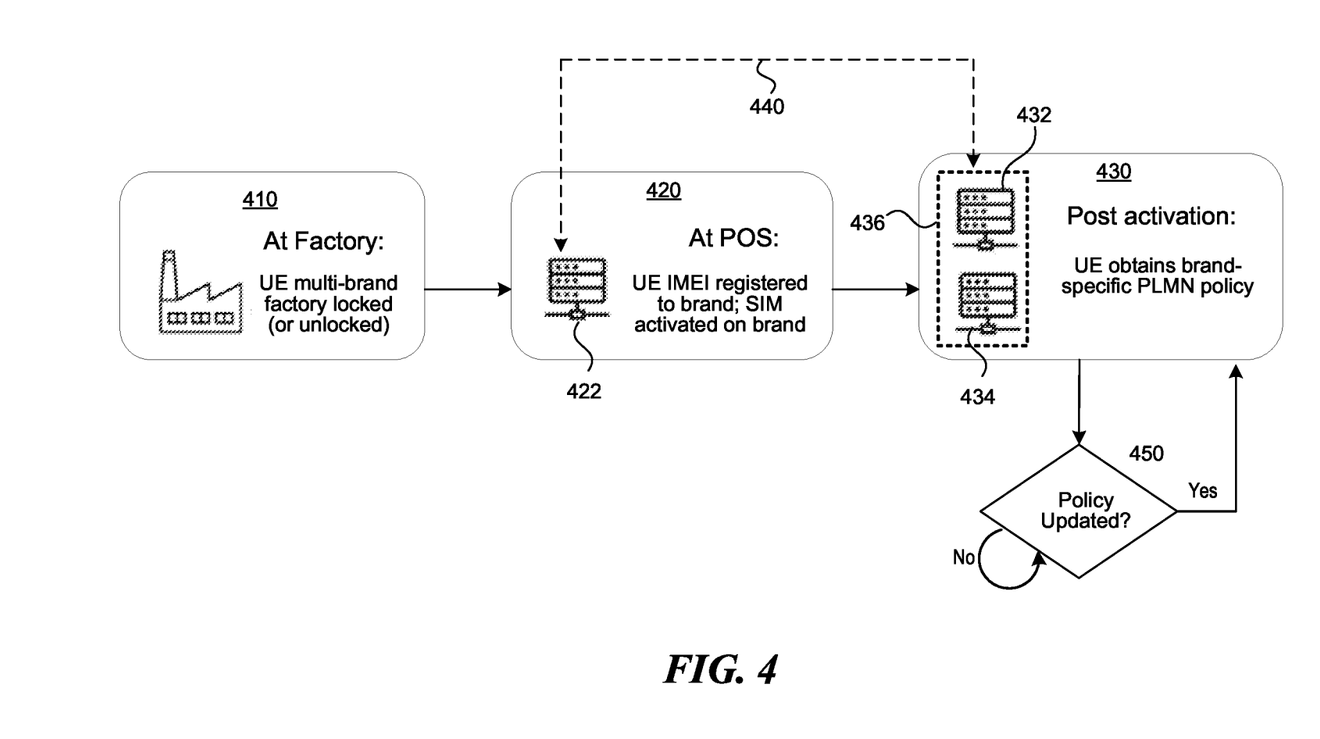
FIG. 4 is a flowchart that illustrates a process for dynamically locking and unlocking a wireless communication device.

FIG. 4 is a flowchart 400 that illustrates a process for dynamically locking and unlocking a wireless communication device or user equipment (UE) (e.g., wireless devices 104 in FIG. 1). At block 410, the UE is multi-brand and/or multi-operator factory locked (or unlocked) as described above in relation to block 310.

At block 420, at the point-of-sale (POS), the UE is registered to a network or a brand (e.g., using the UE's IMEI as described above in relation to block 320) and a SIM is inserted into the UE (or UE's eSIM is programed). The SIM/eSIM is provisioned with network/brand specific information based on a default SIM policy. For example, the SIM/eSIM IMSI is programmed based on the IMSI ranges allocated for the brand/network and the list of services the user has access to is set based on the network/brand the user purchased the UE. A server 422 (e.g., a sales registration server) can be used to store and associated the activated IMEI with the corresponding SIM information.

At block 430, at a time after activation, the UE obtains a brand-specific SIM or PLMN policy (e.g., over the air (OTA) from SIM policy server 432) and branding information (e.g., also OTA from branding server 434), as described above in relation to blocks 350 and 370.

In some implementations the UE obtains the PLMN policy and the branding information from the same storage or server 436. Server 436, or individual servers 432 or 434 or both, can communicate with server 422 (communication depicted with the dashed line 440 in FIG. 4) to associate the IMEI and subscriber information to the corresponding SIM or PLMN policy and branding information that the UE receives. A predefined and updatable mapping can associate PLMN Policy/IMSI Ranges to the Sales Registration process such that a certain brand customer can receive the brand's profile (e.g., a Metro customer always gets the "metro profile" or some variant of the metro profile).

The network operator can set up a policy management system to deliver the PLMN or SIM policy to the UE and manage SIM eligibility. Additionally, the network operator can periodically update the UE lock/unlock policy (e.g., based on the PLMN policy obtained at block 430). Although the UE's modem lock state is initially based on the initial OEM factory-lock (which requires the cellular modem to support the lock state), the network operator can apply different lock states in real time to the UE through PLMN policy updates (e.g., update the UE's lock state based on the policy information). Consequently, the UE can, at any time post-activation, receive a new lock state or new lock policy whitelist update. For example, if at block 450 the PLMN or SIM policy has been updated (e.g., on server 436 or 432), the UE can pull (or the servers 436 or 432 can push) a new PLMN policy defining a new lock state or a new lock policy whitelist (e.g., a new list of networks that the UE is allowed to connect to of SIMs that the UE can accept). Because the policy can change to allow a previously ineligible/invalid SIM to be used with the UE, UE's with ineligible or invalid SIMs can still access the policy server 432 or 436. For example, even if the UE's IMEI is registered to a user who has breached their contract and is attempting to use a subsidized UE on another network (with an ineligible/invalid SIM), such UE can still get updated SIM or PLMN policies (e.g., at block 430).

The dynamic lock policy of the disclosed technology can include different device/modem lock states such as "locked based on PLMN whitelist", "unlocked", and "temporarily locked." This is different from a conventional binary lock/unlock policy where the device is either locked or unlocked. In conventional lock/unlock policies, the UE can be permanently or temporarily unlocked based on a UE-specific (e.g., IMEI-specific) code provided by the network operator (e.g., an unlock code received by the UE over the air).

Conversely, the lock states of the disclosed technology such as "locked based on PLMN whitelist," (locked stated that is locked based on a PLMN whitelist vs just locked to a certain operator/brand) allow the operator to dynamically assign/re-assign the SIMs that can be used with the UE (e.g., to determine what brands/networks the UE can be used in). For example, instead of permanently unlocking a Metro phone to work on any network, T-Mobile can apply a SIM policy to the phone that allows the Metro phone to work with a T-Mobile, Sprint, or Assurance SIM but not work with a Verizon SIM; or work with any T-Mobile and Verizon branded SIM but not with an AT&T SIM; or work with any T-Mobile branded SIM but work only with limited functionality with other SIMs; etc.

Additionally, the operator can temporarily unlock the device based on a dynamically updateable PLMN or SIM policy. For example, the operator can temporarily unlock a mobile phone to work on European networks for a certain duration (e.g., a time period corresponding to the user's travel to Europe). The timer-based temporary unlock can be based on certain IMSI ranges for certain European operators, where the IMSI ranges can be dynamically updated on the policy server and, when obtained by the UE, result in an update to the phone's temporary unlock state in real-time (e.g., an unlocked based on a PLMN whitelist state).

Table 1 below shows an example PLMN whitelist policy based on combinations of the MNC, MCC and GID. In some implementations, the SIM's MNC-MCC+GID must match all three values in the policy to be eligible to connect to the corresponding network.

TABLE 1

| Policy | PLMN Whitelist |
| --- | --- |
| Factory Policy (default, policy reset) | T-Mobile 310-260+544D |
| | T-Mobile 310-240+544D |
| | Assurance 310-240+1A53 |
| | Metro 310-240+6D38 |
| | Lab 310-310 (ignore GID) |
| Postpaid Only Lock (Post Activation) | T-Mobile 310-260+544D |
| | T-Mobile 310-240+544D |
| | Lab 310-310 (ignore GID) |
| Assurance Only Lock (Post Activation) | 310-240+1A53 |
| | Lab 310-310 (ignore GID) |
| Metro Only Lock (Post Activation) | 310-240+6D38 |
| | Lab 310-310 (ignore GID) |

The policy management system can manage SIM eligibility based on various properties. For example, eligible SIMs (e.g., list of SIMs that can be used on the device) can be determined based on the sales channel the user device was sold into (e.g., based on subsidies available in that sales channel); or based on the type of subscriber or application associated with the device (e.g., business use device, personal/individual use device, IoT or machine-to-machine (M2M) device, etc.). For example, IoT devices can be associated with a policy allowing them to accept a wider range of SIMs or other IoT-specific policy (e.g., a different policy from a general postpaid customer policy or a policy specific to the type of IoT device where, for example, a fleet management IoT device might accept SIMs from any operator in the geographic region where the fleet operates but a factory-automation IoT device might only accept a more limited number of SIMs).

The policy management system can also be configured to proactively unlock the UE based on eligibility (e.g., once the user/device is eligible for unlock, for example, because contract period has elapsed, the policy can automatically unlock the device without requiring the user to contact the operator to unlock the device). For example, the SIM policy server 432 can communicate with the sales registration server 422 to determine eligibility based on information collected during the initial device registration/sale (e.g., based on device's IMEI, when service was activated or updated, etc.)

In some implementations, if the UE is unable to obtain the SIM or PLMN policy (e.g., at block 350 in FIG. 3 or block 430 in FIG. 4), the UE can be preconfigured to a certain lock policy. That is, in response to failing to receive updated policy information from the policy server, the UE can continue to use the last policy successfully received or the UE can be configured to a predetermined lock policy. The predetermined lock policy can include a predetermined lock state or a predetermined restriction on one or more UE features. For example, until the UE is able to pull an updated policy from the policy server, the UE can revert to a default lock policy, the UE can lock to accept only specific SIMs, or the UE functionality can otherwise be restricted or limited as described above (e.g., data speed throttled or UE blocked from accessing certain data speeds, capped data limits, limited voice call minutes, access only to certain radio access technologies (RATs) such as access to 3G UMTS but no access to LTE or NR RATs, blocked access to certain applications such as Wi-Fi, etc.).

In some implementations, the disclosed technology can be used in other Internet of Things (IoT) devices with embedded cellular connectivity such as IoT modules, portable hotspots, cellular routers and gateways, home internet devices, and other devices with integrated or embedded cellular modems (e.g., embedded cellular communication devices). The disclosed technology can control the eSIM profiles that are permissible in the IoT devices and can dynamically adapt the branding associated with the eSIM profile. The disclosed technology can also dynamically update the SIM or PLMN policy (e.g., based on a whitelist), to determine in real-time what operator networks the IoT device can attach to and the corresponding branding presented to the user of the IoT device.

For example, a telematics control unit (TCU) OEM can ship TCUs with a universal SKU to different vehicle OEMs (e.g., ship the same TCU hardware to General Motors (GM), Ford, and Chrysler). Providing a universal SKU TCU allows the TCU to potentially be used with any cellular operator's SIM (or the eSIM embedded in the TCU to be activated on any network). Alternatively, the TCU SKU can be factory-locked to operate on select networks (e.g., only on North American networks, only on T-Mobile and AT&T networks, etc.).

The TCU OEM or the vehicle OEM can lock the TCUs or cause them to be locked to operate only on a particular network or with a particular network operator's brand (or with a set of networks or brands). For example, if the TCU or vehicle OEM has a business or contractual relationship with one or more network operators or one or more vehicle brands, they can lock the TCUs to only operate on those networks or on vehicles of that brand and not others. As a result, when a customer purchases a vehicle from the vehicle OEM or dealer, they would only be able to activate the TCU on any of the "approved" networks or network brands. Additionally, or alternatively, the TCU would be unable to be resold as an after-market accessory for use on unapproved vehicle brands.

In some implementations, the vehicle communication device (e.g., the TCU) is shipped from the component supplier unlocked and unbranded (for use with any network or vehicle brand) or locked to one or more network operators (or network brands) and/or one or more vehicle brands. In some implementations, the vehicle OEM or dealer can further register or associate the communication device to a narrower set of network operators or vehicle brands (e.g., vehicle brands owned by the vehicle OEM).

When the communication device (e.g., integrated with the vehicle's in-vehicle infotainment (IVI) system) is provisioned into a particular cellular network, as part of the post-activation flow, the device compares the SIM information (or eSIM profile) with a default policy information in the communication device. If the SIM information matches the default policy (e.g., the SIM information corresponds to the allowed networks), the communication device can receive and apply updated policy information (e.g., pull the updated policy information from a policy server or receive from the policy server push). The updated policy information associates the communication device to a cellular communication network (from the list of allowed networks or networks that the device is locked to) and/or to a vehicle brand (from the list of allowed vehicle brands). Applying the updated policy information to the communication device results in an update to the lock state of the communication device based on the updated policy information. For example, the communication device (e.g., TCU) becomes "locked based on a public land mobile network (PLMN) whitelist state," reverts to an "unlocked state," or goes into a "temporarily unlocked state." The vehicle communication device can receive over-the-air updates of new policy information (e.g., periodically, or when the vehicle travels to a new geographic location). The new policy information can include new PLMN whitelist with which the communication device can use to update its lock state (e.g., to temporarily unlock the TCU to work with network operators in a different market or country such as if traveling to Mexico or Canada).

The communication device compares the SIM information against the updated policy information and, if there is a match, receives branding information (e.g., from the policy server or a separate branding server). If there is no match, a custom message can be displayed in the vehicle's infotainment display indicating the SIM information that matches the updated policy information (e.g., what SIM card or eSIM profile or vehicle brand was expected and what was found). Additionally, or alternatively, the mismatch can cause the vehicle's infotainment system to be blocked from accessing one or more services provided by the cellular communication network or block certain capabilities of the infotainment system or communication device.

The branding information includes information or settings associated with or customized to the cellular communication network (e.g., network brand) or the vehicle brand and can be output by the vehicle's infotainment system (e.g., displayed on the infotainment system display or output from the audio interface of the infotainment system). The branding information can also be used to change default settings of the vehicle's infotainment system. For example, if a first customer purchases a Ford Focus, a second customer purchases a Ford Bronco, and a third customer purchased a Chrysler Pacifica, although the three vehicles could have the same communication device or TCU hardware, each could be factory-locked and dynamically locked/unlocked to different networks, and each could receive different branding based on the vehicle brand and/or the network brand that the TCU is activated on. For example, if each vehicle's TCU is activated on the same operator's network, each vehicle's infotainment display console or other user interface could include branding information or settings associated with both the vehicle's brand and network operator's brand; if a vehicle's TCU is later activated on a different network the branding could change to reflect the new operator's network (or if the TCU is later installed as an after-market accessory in an approved vehicle brand the branding could change to the new vehicle's brand). The branding can include the splash screen, default look and feel, wallpaper, default applications, network slices the communication device has access to, ringtones, etc., as described above.

It will be appreciated that the above example based on vehicle TCUs (or generally cellular communication devices embedded in a vehicle) is only representative and other components or devices that include embedded cellular connectivity (e.g., LTE, NR, cellular-IoT (NB-IoT/LTE-M), etc.) can similarly be dynamically SIM-locked/unlocked (e.g., SIM profile locked to the network operator upon network connection and payload delivery), and the device's interface dynamically rebranded based on the device's brand and/or the network operator's brand in which the device is activated.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions, which, when executed by at least one data processor of a mobile device, cause the mobile device to:
   compare a subscriber identity module (SIM) information against a default policy information,
      wherein the SIM information is stored in a SIM inserted into or embedded within the mobile device,
      wherein the mobile device is factory-locked to two or more networks or to two or more network brands, and
      wherein the mobile device is registered to a network of the two or more networks or to a brand of the two or more network brands;
   receive an updated policy information in response to determining that the SIM information matches the default policy information;
   apply or store the updated policy information on the mobile device;
   compare the SIM information against the updated policy information;
   receive a branding information in response to determining that the SIM information matches the updated policy information; and
   apply the branding information to the mobile device to thereby provide the branding information for display on the mobile device or to change default branding on the mobile device.

2. The at least one computer-readable storage medium of claim 1, wherein the mobile device is further caused to:
   block access to one or more features of the mobile device in response to determining that the SIM information does not match the updated policy information,
      wherein the one or more features comprise;
         access to specific applications,
         access to certain data speeds, or
         access to specific radio access technologies.

3. The at least one computer-readable storage medium of claim 1, wherein the mobile device is further caused to:
   update a lock state of the mobile device based on the updated policy information,
      wherein the lock state comprises:
         a locked based on a public land mobile network (PLMN) whitelist state,
         an unlocked state, or
         a temporarily unlocked state, and
      wherein the locked based on a PLMN whitelist state restricts the mobile device to a SIM containing a value of a mobile network code (MNC), a value of a mobile country code (MCC), and a value of a group identity (GID), that matches corresponding values in the updated policy information.

4. The at least one computer-readable storage medium of claim 3, wherein the mobile device is further caused to:
   receive a new policy information comprising a new PLMN whitelist; and
   update the lock state based on the new PLMN whitelist.

5. The at least one computer-readable storage medium of claim 1, wherein in response to determining that the updated policy information does not match the SIM information, the mobile device is further caused to:
   display, at a display of the mobile device, a custom message indicating a SIM information that matches the updated policy information, suppressing a Wi-Fi calling feature of the mobile device, or restricting access to one or more network slices.

6. The at least one computer-readable storage medium of claim 1:
   wherein in response to failing to receive the updated policy information, configuring the mobile device to a predetermined lock policy, and
   wherein the predetermined lock policy comprises a predetermined lock state or a predetermined restriction on one or more features of the mobile device.

7. A method comprising:
   comparing a subscriber identity module (SIM) information against a default policy information,
      wherein the SIM information is stored in a SIM inserted into or embedded within a mobile device,
      wherein the mobile device is factory-locked to two or more networks or to two or more network brands, and wherein the mobile device is registered to a network of the two or more networks or to a brand of the two or more network brands;
receiving an updated policy information in response to determining that the SIM information matches the default policy information;
applying or storing the updated policy information on the mobile device;
comparing the SIM information against the updated policy information;
receiving a branding information in response to determining that the SIM information matches the updated policy information; and
applying the branding information to the mobile device to thereby provide the branding information for display on the mobile device or to change default branding on the mobile device.

8. The method of claim 7 further comprising:
blocking access to one or more features of the mobile device in response to determining that the SIM information does not match the updated policy information, wherein the one or more features comprise:
  access to specific applications,
  access to certain data speeds, or
  access to specific radio access technologies.

9. The method of claim 7 further comprising:
updating a lock state of the mobile device based on the updated policy information,
  wherein the lock state comprises:
    a locked based on a public land mobile network (PLMN) whitelist state,
    an unlocked state, or
    a temporarily unlocked state, and
    wherein the locked based on a PLMN whitelist state restricts the mobile device to a SIM containing a value of a mobile network code (MNC), a value of a mobile country code (MCC), and a value of a group identity (GID), that matches corresponding values in the updated policy information.

10. The method of claim 9 further comprising:
receiving a new policy information comprising a new PLMN whitelist; and
updating the lock state based on the new PLMN whitelist.

11. The method of claim 7, wherein, in response to determining that the updated policy information does not match the SIM information, the method further comprises:
displaying, at a display of the mobile device, a custom message indicating a SIM information that matches the updated policy information,
suppressing a Wi-Fi calling feature of the mobile device, or
restricting access to one or more network slices.

12. The method of claim 7, wherein, in response to failing to receive the updated policy information, the method further comprises:
configuring the mobile device to a predetermined lock policy,
  wherein the predetermined lock policy comprises:
    a predetermined lock state, or
    a predetermined restriction on one or more features of the mobile device.

13. A mobile device comprising:
at least one hardware processor; and
at least one non-transitory memory storing instructions, which, when executed by the at least one hardware processor, cause the mobile device to:
compare a subscriber identity module (SIM) information against a default policy information,
  wherein the SIM information is stored in a SIM inserted into or embedded within the mobile device,
  wherein the mobile device is factory-locked to two or more networks or to two or more network brands, and
  wherein the mobile device is registered to a network of the two or more networks or to a brand of the two or more network brands;
receive an updated policy information in response to determining that the SIM information matches the default policy information;
apply or store the updated policy information on the mobile device;
compare the SIM information against the updated policy information;
receive a branding information in response to determining that the SIM information matches the updated policy information; and
apply the branding information to the mobile device to thereby provide the branding information for display on the mobile device or to change default branding on the mobile device.

14. The mobile device of claim 13 further caused to:
block access to one or more features of the mobile device in response to determining that the SIM information does not match the updated policy information.

15. The mobile device of claim 14 wherein the one or more features comprise:
access to specific applications,
access to certain data speeds, or
access to specific radio access technologies.

16. The mobile device of claim 13 further caused to:
update a lock state of the mobile device based on the updated policy information,
  wherein the lock state comprises:
    a locked based on a public land mobile network (PLMN) whitelist state,
    an unlocked state, or
    a temporarily unlocked state, and
    wherein the locked based on a PLMN whitelist state restricts the mobile device to a SIM containing a value of a mobile network code (MNC), a value of a mobile country code (MCC), and a value of a group identity (GID), that matches corresponding values in the updated policy information.

17. The mobile device of claim 16 further caused to:
receive a new policy information comprising a new PLMN whitelist; and
update the lock state based on the new PLMN whitelist.

18. The mobile device of claim 13, wherein, in response to determining that the updated policy information does not match the SIM information, the mobile device is further caused to:
display, at a display of the mobile device, a custom message indicating a SIM information that matches the updated policy information, suppressing a Wi-Fi calling feature of the mobile device, or restricting access to one or more network slices.

19. The mobile device of claim 13, wherein, in response to failing to receive the updated policy information, the mobile device is caused to:
configure the mobile device to a predetermined lock policy, wherein the predetermined lock policy comprises a predetermined lock state or a predetermined restriction on one or more features of the mobile device.

20. The mobile device of claim 19, wherein the predetermined lock policy comprises the predetermined restriction on one or more features of the mobile device.

\* \* \* \* \*